(12) United States Patent
Ai et al.

(10) Patent No.: US 8,483,205 B2
(45) Date of Patent: Jul. 9, 2013

(54) SYNCHRONIZATION METHOD OF COMMON CONTROL MESSAGE AMONG NETWORK ELEMENTS

(75) Inventors: Jianxun Ai, Shenzhen (CN); Cuifeng Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 273 days.

(21) Appl. No.: 12/988,633

(22) PCT Filed: Apr. 23, 2009

(86) PCT No.: PCT/CN2009/071424
§ 371 (c)(1),
(2), (4) Date: Nov. 24, 2010

(87) PCT Pub. No.: WO2009/132565
PCT Pub. Date: Nov. 5, 2009

(65) Prior Publication Data
US 2011/0058513 A1    Mar. 10, 2011

(30) Foreign Application Priority Data
Apr. 30, 2008 (CN) .......................... 2008 1 0094448

(51) Int. Cl.
*H04J 3/06* (2006.01)
(52) U.S. Cl.
USPC .......................................... 370/350; 370/509
(58) Field of Classification Search
USPC ................. 370/324, 350, 390, 432, 503, 509
See application file for complete search history.

(56) References Cited

U.S. PATENT DOCUMENTS

| | | | |
|---|---|---|---|
| 2006/0223532 A1* | 10/2006 | Liu et al. ........................ | 455/436 |
| 2007/0047500 A1* | 3/2007 | Usuda et al. ................... | 370/335 |
| 2007/0258402 A1* | 11/2007 | Nakamata et al. ............. | 370/329 |
| 2008/0212546 A1* | 9/2008 | Fischer ......................... | 370/338 |
| 2009/0010255 A1* | 1/2009 | Kim et al. ..................... | 370/389 |
| 2010/0135220 A1* | 6/2010 | Bergstrom et al. ............ | 370/329 |
| 2010/0174809 A1* | 7/2010 | Chun et al. .................... | 709/221 |
| 2010/0325504 A1* | 12/2010 | Lee et al. ...................... | 714/748 |
| 2011/0085488 A1* | 4/2011 | Widegren ..................... | 370/312 |
| 2012/0026930 A1* | 2/2012 | Kuo .............................. | 370/312 |
| 2012/0026982 A1* | 2/2012 | Kuo et al. ..................... | 370/331 |

FOREIGN PATENT DOCUMENTS

| | | |
|---|---|---|
| CN | 1852049 A | 10/2006 |
| CN | 101043639 A | 9/2007 |
| CN | 101043641 A | 9/2007 |
| CN | 101051889 A | 10/2007 |
| JP | 2005323113 A | 11/2005 |
| JP | 2007510356 A | 4/2007 |
| WO | 2008024214 A2 | 2/2008 |

OTHER PUBLICATIONS

International Search Report on international application No. PCT/CN2009/071424, mailed on Jul. 30, 2009.

(Continued)

*Primary Examiner* — Andrew Lee
(74) *Attorney, Agent, or Firm* — Oppedahl Patent Law Firm LLC

(57) ABSTRACT

The present invention discloses a synchronization method of common control messages among network elements. The method includes that the central network element instructs the distributed network elements to synchronously update the common control messages of the respective specific cells of the distributed network elements. By using the present invention, the synchronous update and synchronous transmission of the common control messages among the cells of different network elements can be realized.

10 Claims, 5 Drawing Sheets

OTHER PUBLICATIONS

English Translation of the Written Opinion of the International Search Authority in international application No. PCT/CN2009/071424, mailed on Jul. 30, 2009.

Technical Specification Group Radio Access Network Mar. 2008.
MBMS Considerations for HSPA Evolution Feb. 11-15, 2008.
3GPP Technical Report TR R3.022 V.0.5.0 Sep. 2008.

* cited by examiner

SYNCHRONIZATION METHOD OF COMMON CONTROL MESSAGE AMONG NETWORK ELEMENTS

TECHNICAL FIELD

The invention relates to the field of communications, and in particular, to a synchronization method of common control messages among network elements.

BACKGROUND

At present, demands from people for mobile communications are not limited to telephone and message services, with the rapid development of the Internet, a plenty of multimedia services have emerged. In some of the services, multiple users enable to receive the same data synchronously, such as video on demand, television broadcast, video conference, online education, interactive game and the like. A multimedia broadcast multicast service (MBMS) technology is proposed for the most effective utilization of mobile network resources, in this technology, a point-to-multipoint service in which a data source sends data to multiple users realizes the share of network resources, including the share of mobile core network resources and access network resources, and especially, interface resources. An MBMS defined by the $3^{rd}$ generation partnership project (3GPP) can realize not only multicast and broadcast of plain text messages at low speed but also multicast and broadcast of multimedia services at high speed, which undoubtedly conforms to the future trend of mobile data development.

As a technology for improving the spectrum utilization rate of an MBMS, an MBMS single frequency network (MBSFN) technology requires all adjacent base stations to send the same radio signals synchronously, and a user equipment (UE) may take signals from different base stations as multi-path signals, in this way, a great signal gain can be obtained during broadcast service transmission through a common physical channel, and consequently, the quality of service (QoS) of an MBSM service can be improved. A group of cells that send MBMS radio signals synchronously form an MBSFN synchronization area and are known as MBSFN cells. The cells in the MBSFN synchronization area synchronously send the same radio signals including MBMS signals, all or part of system messages, point-to-multipoint control channel messages (MCCH messages), and MBMS notification indicator channel (MICH) messages.

In a 3GPP UTRAN (universal mobile telecommunication systems (UMTS) terrestrial radio access network) architecture protocol, a system message consists of information blocks (IB), which are functionally classified into a master information block (MIB), a scheduling information block and a system information block. When these information blocks are transmitted via radio interfaces, they are further divided into multiple segments, and these segments are further classified in terms of type into a first segment, a middle segment, a last segment, an integral segment and the like and are sent according to scheduling, and the time for sending each segment can be determined according to the following formula: SFN mod repetition period=segment location.

In a 3GPP long term evolution (LTE) architecture, the following change is made on scheduling of information blocks: a scheduling unit (SU) is defined, and one or more information blocks are mapped into one scheduling unit.

According to the definition of existing protocols of the 3GPP, the MCCH is a logical channel, an MCCH message includes a series of MBMS control messages, scheduling information of which includes a modification period and a repetition period, and in one modification period, an MCCH message is sent via a radio interface for many times according to a repetition period, while the contents of the message can not be modified in the modification period; for the sake of synchronization, a repetition period and modification period of a cell should be identical with those of other cells.

According to the definition of existing protocols of the 3GPP, the MICH is a physical channel for notifying a UE of the change of an MBMS in an MCCH message.

The following is an existing networking technology adopting MBSFN carrier frequency:

In a time division-synchronous code division multiple access (TD-SCDMA) technology, a networking technology using MBSFN-dedicated carrier frequency is adopted, in which all the physical channels in all time slots on a frequency are synchronous with physical channels in time slots on the same frequency of an adjacent cell in terms of contents and time, wherein system messages, MCCH messages and MICH messages of the adjacent cell are also required to be sent synchronously.

In a wideband code division multiple access (WCDMA) technology, signals of all the channels in a cell adopting an MBSFN networking are required to be synchronous with contents and time of physical channels on the same frequency of an adjacent cell, wherein it is also necessary to send system messages, MCCH messages and MICH messages of the adjacent cell synchronously.

In a frequency division duplex (FDD) high speed packet access plus (HSPA+) technology, signals of all the channels in a cell adopting an MBSFN networking are required to be synchronous with contents and time of physical channels on the same frequency of an adjacent cell, wherein it is also necessary to send system messages, MCCH messages and MICH messages of the adjacent cell synchronously.

In an LTE system, cells adopting an MBSFN networking are required to synchronously send the same radio signals of the same radio resource blocks on the same frequency, and system messages thereof are classified into global system messages and local system messages, wherein the global system messages and the MCCH messages in the MCCH MBSFN area are required to be sent synchronously.

All the technologies above refer to the circumstances that adjacent cells are required to send all or part of radio interface control messages synchronously.

Moreover, an MBMS is oriented to the whole network, the same MBMS may be established on nodes of different distributed network elements, therefore cells among these nodes of different distributed network elements are also required to send all or part of system messages of the cells synchronously, otherwise, a UE cannot obtain a reception gain when receiving the system messages, which may result in strong co-channel interference.

The following is a method for realizing MBSFN synchronization among multiple network elements in related technologies.

FIG. 1 is an example diagram of an MBMS synchronization networking according to the UTRAN architecture of TD-SCDMA and WCDMA of related technologies. As shown in FIG. 1, a master radio network controller (RNC) is connected with multiple slave RNCs via Iur interfaces, the master RNC (e.g. SRNC) and slave RNC1 (e.g. DRNC1) are connected with serving general packet radio service supporting node-1 (SGSN-1) via Iu interfaces, slave RNCn (DRNCn) is connected with SGSN-2 via an Iu interface, the slave RNC1 is connected with base station-1 (NodeB-1), the master RNC is connected with base station-2 (NodeB-2), and the slave RNCn is connected with base station-3 (NodeB-3).

FIG. 2 is an example diagram of an MBMS synchronization networking according to the HSPA+ flat architecture of related technologies. As shown in FIG. 2, a master base station+ (master Node B+, or RNC) is connected with one or more slave base stations+ (slave Node B+) via Iur interfaces, and the master Node B+ or the RNC is connected with SGSN-1. The full name of MGW is media gateway.

FIG. 3 is an example diagram of an MBMS synchronization networking according to the E-UTRAN architecture of LTE of related technologies. As shown in FIG. 3, a logical network element (e.g. a multi-cell/multicast coordination entity, MCE) is connected with one or more evolved universal mobile telecommunication systems (UMTS) terrestrial radio access network base stations (E-UTRAN Node B, ENB) via M2 interfaces.

In existing technologies, common control messages of each cell, such as system messages, MCCH messages, and MICH messages, are respectively constructed on each network element node and scheduled and sent; if an MBSFN area exceeds the range of a cell where a network element is located and there is no coordination mechanism for cells where multiple network elements are located, then it is difficult or even impossible to realize synchronization of radio interface control messages of these cells. For a UE, radio interface control messages of MBSFN cells cannot be sent and received in an MBSFN manner, thus bringing about strong interference among adjacent cells.

However, existing technologies do not provide a coordination mechanism for multiple network elements on the same layer which coordinate transmission of an MBMS, e.g., lacking a technical solution for coordination between a master RNC and a slave RNC, or between an MCE and an ENB in LTE, and no effective solution has currently been proposed for addressing this problem.

SUMMARY

Considering the lack of a coordination mechanism in related technologies, the invention is proposed mainly for providing a synchronization method for common control messages among network elements to solve the problem that an MBMS cannot be carried out in an MBSFN manner in related technologies due to the lack of a coordination mechanism.

According to an embodiment of the invention, a synchronization method of common control messages among network elements is provided, which is applied to a networking in which an MBMS is carried out in an MBSFN manner, wherein the networking includes a central network element and at least one distributed network element.

The method includes that the central network element instructs the distributed network elements to synchronously update common control messages of their respective specific cells.

Wherein the central network element sends a first control plane message containing an update condition to instruct the distributed network elements to update their respective common control messages; and the distributed network elements update the common control messages according to the first control plane message.

Further, after the distributed network elements correctly receive the instruction from the central network element and, before the update is started or after the update is successfully finished, the method may further include: the distributed network elements respectively return a second control plane message to the central network element to indicate that the instruction is received successfully or the update is successful.

On the other hand, after the distributed network elements receive the instruction from the central network element, in the case where the distributed network elements cannot carry out the update correctly, the method may further include: the distributed network elements respectively return the central network element a third control plane message indicating the failed update.

Wherein the update condition may include at least one of the following: update time, and information on specific target cells in which message update is carried out; wherein the specific target cells refer to all cells or cells specified by the target cell information contained in the update condition.

The common control messages may include at least one of the following: system messages, MCCH messages and MICH messages.

Wherein in the case where the common control messages in need of update are system messages, the update condition may further include at least one of the following: an information block list of the system messages, and an operation instruction corresponding to an information block in the information block list; and the operation instruction may include one of the following: deleting information block, updating information block and updated data information; wherein scheduling information of the information block may be further included.

On the other hand, in the case where the common control messages in need of update are MCCH messages, the update condition may further include at least one of the following: update information of the MCCH messages, scheduling information of MCCHs, and identifiers of the MCCHs.

Furthermore, in the case where the common control messages in need of update are MICH messages, the update condition may further include at least one of the following: update information of the MICH messages, and scheduling information of MICHs.

Further, the update time may specifically include one of the following: system frame number of a radio interface, connection frame number of a radio interface, time, and coordination time of the network elements in the networking.

Further, the target cell information specifically may be at least one of the following: a cell identifier, an identifier of a synchronization area of the MBSFN, and frequency information of a cell.

Preferably, the central network element sends an updated radio interface control plane common control message to the distributed network elements by sending a user plane message, the distributed network elements update common control messages of their respective specific cells according to the user plane message, wherein the user plane message includes common control message data processed on a radio network protocol layer and time stamp information thereof that indicates the time for sending the common control message data via a radio interface.

Optionally, in the case where the networking belongs to a UTRAN, the central network element is a master radio network controller and the distributed network element is a slave radio network controller; or in the case where the networking belongs to an HSPA+ system, the central network element is a master control Node B+ and the distributed network element is a slave Nodes B+; or in the case where the networking belongs to an LTE system, the central network element is an MCE, and the distributed network element is an E-UTRAN Node B.

In the above mentioned technical solution of the invention, a central network element is adopted to instruct at least one distributed network element to synchronously update common control messages of their respective specific cells, thereby solving the problem that an MBMS cannot be carried out in an MBSFN manner due to the lack of a coordination mechanism, and realizing the synchronous update and synchronous transmission of the common control messages among cells of different network elements.

BRIEF DESCRIPTION OF THE DRAWINGS

In order to make the invention be understood better, the following figures are provided to be a part of the invention, and exemplary embodiments provided in the invention and the description thereof are for explaining the invention but not for limiting the invention. In the following drawings.

DETAILED DESCRIPTION

Function Overview

Considering the lack of a coordination mechanism in related technologies, a synchronization method of common control messages among network elements is provided in an embodiment of the invention, which is applied to a networking in which an MBMS is carried out in an MBSFN manner, wherein the networking includes a central is network element and at least one distributed network elements. The method includes that the central network element instructs the distributed network elements to synchronously update common control messages of their respective specific cells.

Figure 4:
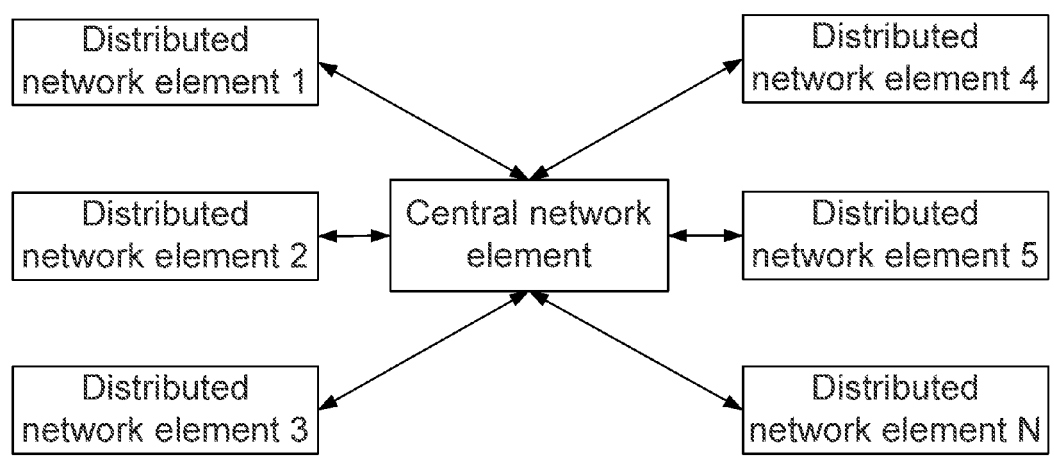
FIG. 4 is a logical schematic diagram of distributed network elements and a central network element according to a method provided in an embodiment of the invention.

An embodiment of the invention provides a synchronization method of common control messages among network elements, applied to a networking in which an MBMS is carried out in an MBSFN manner, wherein the networking includes a central network element and at least one distributed network element, and the logical architecture of the network is as shown in FIG. 4.

An embodiment of the invention provides a synchronization method of common control messages among network elements, applied to a networking in which an MBMS is carried out in an MBSFN manner, wherein the networking includes a central network element and at least one distributed network element.

Figure 5:
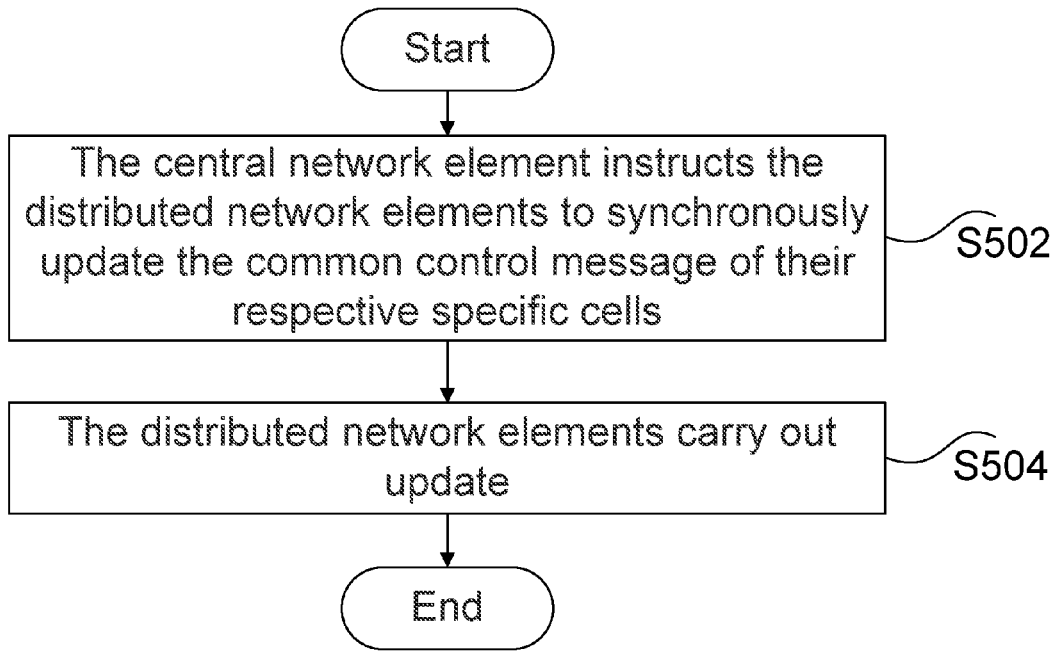
FIG. 5 is a flowchart of a synchronization method of common control messages among network elements according to an embodiment of the invention.

FIG. 5 is a flowchart of a synchronization method of common control messages among network elements according to an embodiment of the invention, as shown in FIG. 5, the synchronization method of common control messages among network elements according to the embodiment of the invention includes: step S502, a central network element instructs distributed network elements to synchronously update common control messages of their respective specific cells; and step S504, the distributed network elements carry out the update.

Wherein the central network element sends a first control plane message containing an update condition to instruct the distributed network elements to update their respective common control messages; and the distributed network elements update the common control messages according to the first control plane message.

Further, after the distributed network elements correctly receive the instruction from the central network element, and before the update is started or after the update is successfully finished, the method further includes: the distributed network elements respectively return a second control plane message to the central network element to indicate that the instruction is received successfully or the update is successful.

On the other hand, after the distributed network elements receive the instruction from the central network element, in the case where the distributed network elements cannot carry out the update correctly, the method further includes: the distributed network elements respectively returns a third control plane message indicating the failed update to the central network element.

Further, the update condition may include at least one of the following: update time, and information on the specific target cells in which the message update is carried out, wherein the specific target cells refer to all cells or a cell specified by the target cell information contained in the update condition.

The common control messages may include at least one of the following: system messages, MCCH messages and MICH messages.

Wherein in the case where the common control messages in need of update are system messages, the update condition further includes at least one of the following: an information block list of the system messages and an operation instruction corresponding to an information block in the information block list; and the operation instruction includes one of the following: updating information block, updating information block and updated data information, wherein scheduling information of the information block is further included.

On the other hand, in the case where the common control messages in need of update are MCCH messages, the update condition further includes at least one of the following: update information of the MCCH messages, scheduling information of MCCHs, and identifiers of the MCCHs.

Furthermore, when the common control messages in need of update are MICH messages, the update condition further includes at least one of the following: update information of the MICH messages and scheduling information of MICHs.

Further, the update time may specifically include one of the following: system frame number of a radio interface, connection frame number of a radio interface, time, and coordination time of the networking elements.

Further, the target cell information is specifically at least one of the following: a cell identifier, an identifier of a synchronization area of the MBMS, and frequency information of a cell.

Preferably, the central network element sends an updated radio interface control plane common control message to the distributed network elements by sending a user plane message, the distributed network elements update the common control messages of their respective specific cells according to the user plane message, and the user plane message includes common control message data processed on a radio network protocol layer and time stamp information of indicating the time for sending the common control message data via a radio interface.

That is, through a one-to-one signaling process between one central network element and each distributed network element in the networking, the central network element instructs one or more distributed network elements to synchronously update the contents of the same common control messages in a specified target cell at the same time.

Optionally, in the case where the networking belongs to a UTRAN, the central network element is a master radio network controller and the distributed network elements are slave radio network controllers: or in the case where the networking belongs to a HSPA+ system, the central network element is a master control Node B+ and the distributed network elements are slave Nodes B+; or in the case where the networking belongs to an LTE system, the central network element is an MOE, and the distributed network elements are E-UTRAN Node B.

It should be noted that the central network element and the one or more distributed network elements herein can be identical or different network elements in terms of physical function, these network elements are logically classified into a central network and distributed network elements only for cooperatively realizing radio interface common control, that is, multiple identical or different physical network elements are classified into a central network element and multiple distributed network dements in terms of logical function, and the network elements cooperate with each other to send an MBMS in an MBSFN manner in distributed network element cells.

Figure 1:
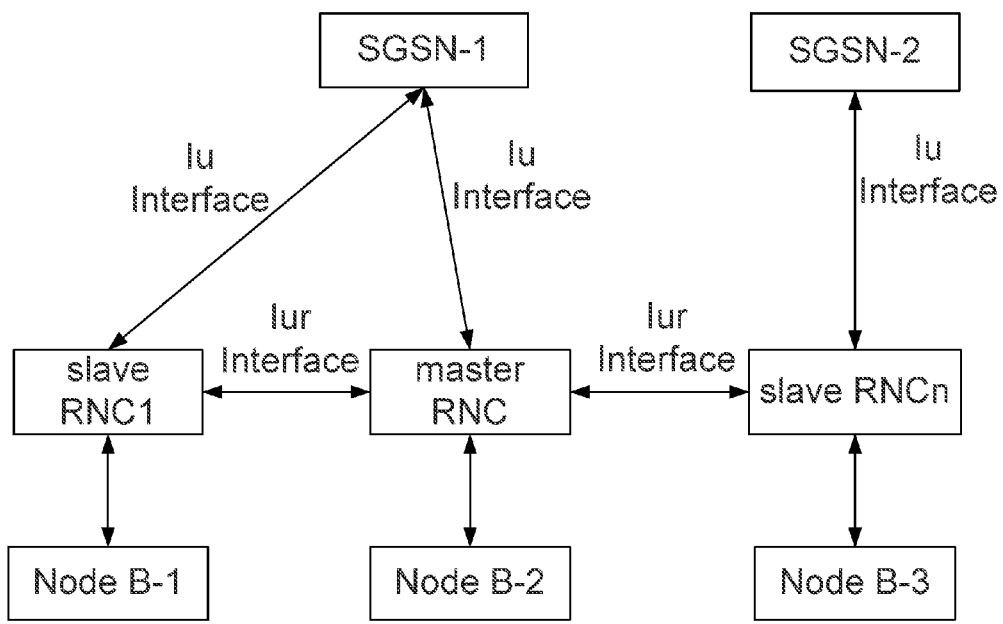
FIG. 1 is a diagram of an MBMS synchronization network in a UTRAN system according to related technologies.
Figure 2:
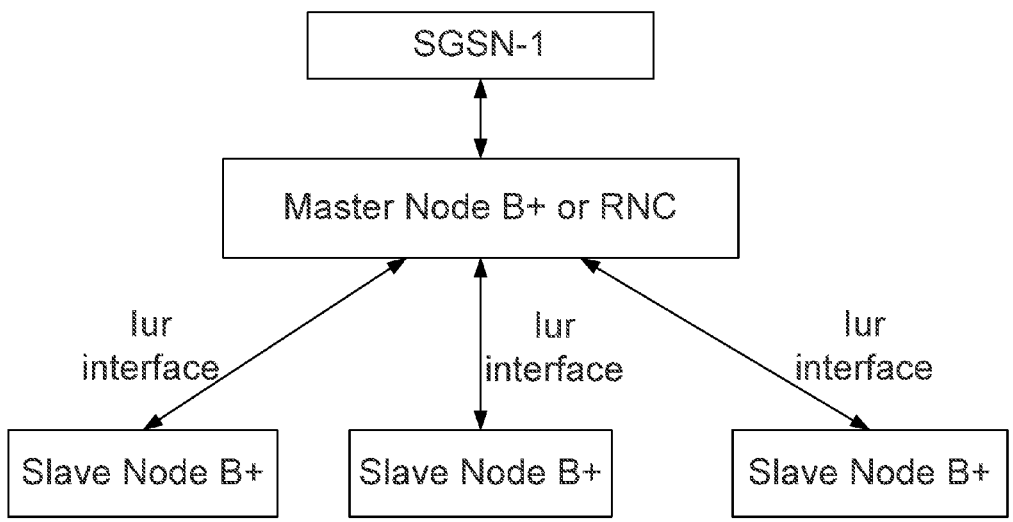
FIG. 2 is a diagram of an MBMS synchronization network in an HSFA+ flat architecture according to related technologies.
Figure 3:
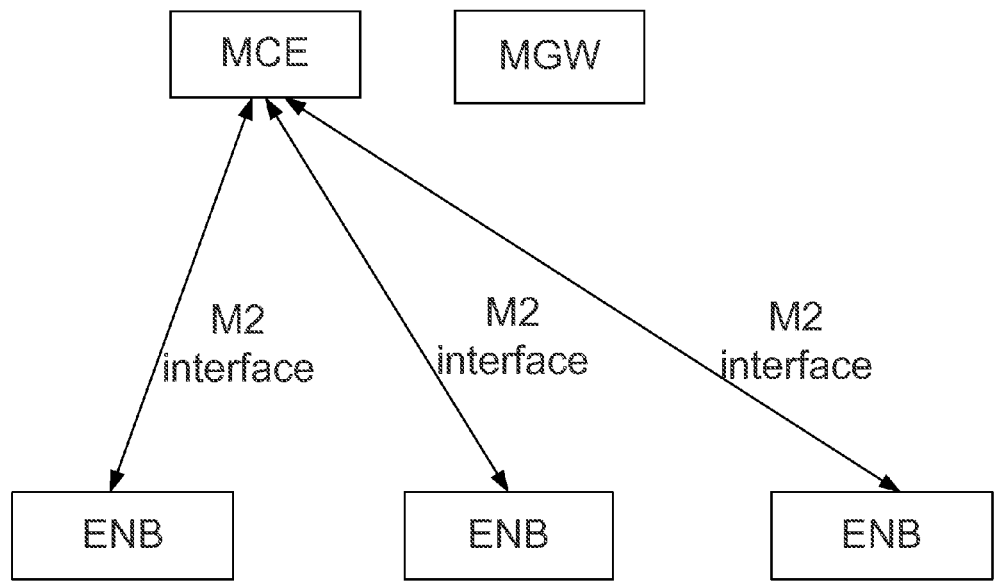
FIG. 3 is a diagram of an MBMS synchronization network in an E-UTRAN architecture according to related technologies.

In this invention, the central network element and the distributed network elements can be the combinations of the following network elements but are not limited to the following combinations:

1. in an MBMS synchronization networking of a UTRAN system, as shown in FIG. 1, is the central network element is a master RNC, the distributed network elements are slave RNCs, interfaces between the central network element and the distributed network elements are Iur interfaces; in this combination, the central network element and the distributed network elements have the same physical function;

2. in an MBMS synchronization networking of HSPA+, as shown in FIG. 2, the central network element is an RNC or a master Node B+, the distributed network elements are slave Nodes B+, interfaces between the central network dement and the distributed network elements are Iur interfaces; in this combination, the central network element and the distributed network elements have the same physical function;

3. in an MBMS synchronization networking of an LTE system, as shown in FIG. 3, the central network element is an MCE, the distributed network elements are evolved UTRAN Nodes B (ENB), and interfaces between the central network element and the distributed network elements are M2 interfaces.

The invention is described hereinafter in combination with the following specific embodiments.

Example One

Update to System Messages

Figure 6:
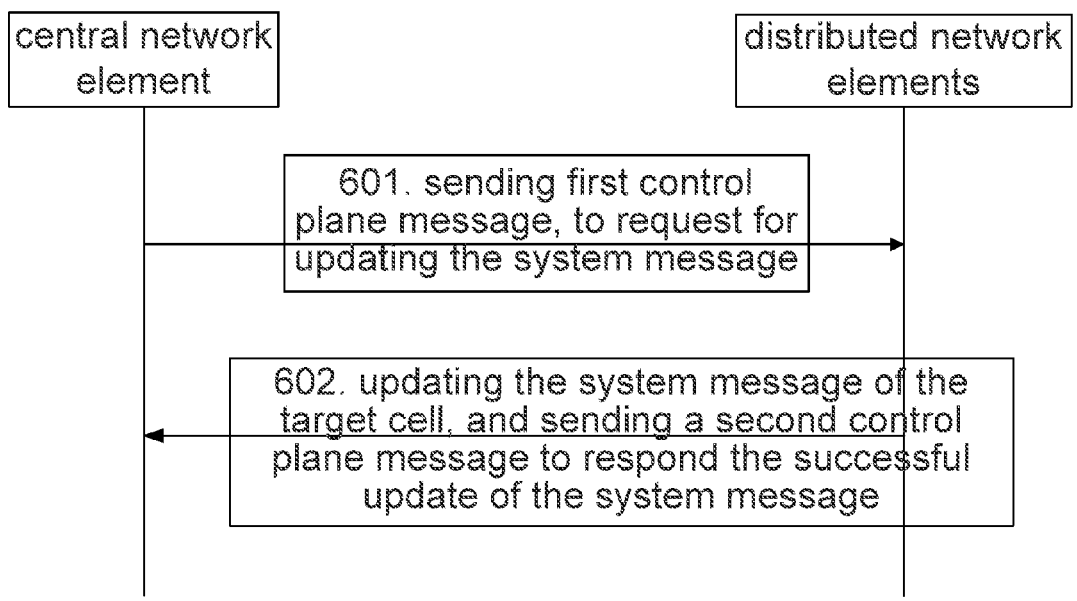
FIG. 6 is a signaling flowchart of processing Example One of a method according to an embodiment of the invention.

In a group of networking elements, when a central network element needs to update system messages of MBSFN cells of one or more distributed network elements, the central network element and each distributed network element update control plane information via an interface between them. FIG. 6 is a signaling flowchart of processing Example One of a method according to an embodiment of the invention, as shown in FIG. 6, the flow specifically includes the following steps 601 and 602:

step 601, a central network element sends a first control plane message to one or more distributed network elements; wherein the contents contained in the message includes all or part of the following information: system message update information, system message update time and target cells in need of update; if the target cells belong to the same MBSFN synchronization area, the first control plane messages sent to the distributed network elements have the same update time information and the same system message update information;

step 602, each distributed network element correctly receives the first control plane is message and respectively responds with a second control plane message via an interface between each distributed network element and the central network element, wherein the second control plane message is used for each distributed network element to respond to the central network element on the correct reception of the first control plane message; and each distributed network element updates a system message of a target cell at the moment specified by the system message update time according to the contents contained in the first control plane message.

The following contents (namely, the update condition above) may be contained in the first control plane message:

1. system message update time T: this information specifies update time of system messages, namely, the update time may be presented in the following forms when an update is made to the system message update information contained in the first control plane message via a radio interface of a target cell: (a) system frame number (SFN) of a radio interface; (b) an absolute time value; and (c) coordination time of the central network element and the distributed network elements:

2. information on target cells in which a system message update is carried out: this information specifies a target cell or target cells in which the system message update information contained in the first control plane message is to be updated and can be presented in the following forms: (a) an identifier of a target cell, (b) an identifier of an MBSFN synchronization area, in this circumstances, the system message update information contained in the first control plane message is updated in all the cells in the MBSFN synchronization area, and (c), frequency information of a cell, in this circumstances, the system message update information contained in the first control plane message is updated in all the cells specified by the frequency;

3. system message update information: this information may further include a list of information blocks (IBs) and operation instruction information on each information block in the list; and the operation instruction herein may be (a) deletion of the information blocks and (b) non-deletion of the information blocks (update to the information blocks). If the operation is non-deletion of an information block, each item of the list further includes the following contents: (1) data contents of an information is block, which may be data information of multiple segments of an information block or data information of an integral information block; (2) scheduling information of an information block, which includes repetition period information of an information block and may further include one of the following information: (1) location information of each segment in one repetition period if an information block is segmented; (2) mapping information of each information block in a scheduling unit; and (3) scheduling information which defines information blocks possibly to be sent.

In the embodiment, the system message block includes but is not limited to all or part of the following information block types: a master information block (MB), system information block 3 (SIB 3), system information block 5 (SIB 5) and system information block 11 (SIB 11).

In step 602 of the embodiment, that the distributed network element updates a system message of a target cell refers to one of the following situations: (1) if the distributed network element is an RNC, the distributed network element sends an Iub message to a Node B where the target cell is located, and carries corresponding system message update information and system message update time information in the Iub message; (2) if the distributed network element is an ENB or a Node B+ or other similar network element, the distributed network element directly updates a system message of the target cell and sends the system message via a radio interface at the update time.

In the embodiment, the central network element sends the first control plane message to the distributed network elements when (1) the central network element needs to update system messages of MBSFN cells of the distributed network elements; or (2) the distributed network elements, via control plane messages, require the central network element to update system messages of MBSFN cells of the distributed network elements.

Example Two

Synchronization of MCCH Messages

Figure 7:
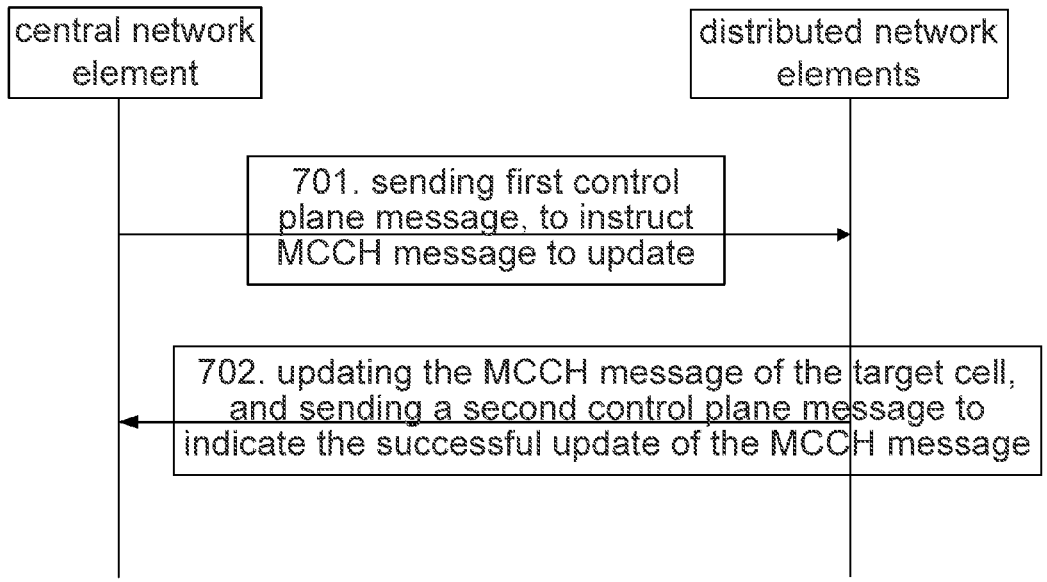
FIG. 7 is a signaling flowchart of processing Example Two of a method according to an embodiment of the invention.

In this embodiment, in a group of networking elements, when a central network element needs to update MCCH messages of MBSFN cells of one or more distributed network elements, the central network element and each distributed network element update control plane information via an interface between them. FIG. 7 is a signaling flowchart of processing Example Two of a method according to an embodiment of the invention, as shown in FIG. 7, the flow specifically includes the following steps 701 and 702:

step 701, a central network element sends a first control plane message to one or more distributed network elements, the contents contained in the message includes all or part of the following information: MCCH message update information, MCCH message update time information, MCCH scheduling information, target cell information and target MCCH information; if target cells belong to the same MBSFN synchronization area, the first control plane messages sent to the target cells have the same MCCH message update time information and the same MCCH update information; and step 702, each distributed network element correctly receives the first control plane message and respectively responds with a second control plane message via an interface between each distributed network element and the central network element, wherein the second control plane message is used for each distributed network element to respond to the central network element on the correct reception of the first control plane message; and each distributed network element updates an MCCH message of a target cell according to the contents contained in the first control plane message, the MCCH message update time information and the MCCH scheduling information.

At least one of the following contents may be contained in the first control plane message:

1. MCCH message update time information; this information indicates the time for updating the MCCH message update information contained in the first control plane message via a radio interface of a target cell, and this information may be presented in one of the following forms: system frame number (SFN) of a radio interface; an absolute time value; connection frame number (CFN) of a radio frame of an FACH to which the MCCH is mapped; information of a specific modification period after reception of the first control plane message, wherein updating is started from the specific modification period; or coordination time of the central network element and the distributed network elements;

2. target cell information: this information specifies a target cell or target cells in which the MCCH message update information contained in the first control plane message is updated, and this information can be presented in the following forms: (a) identifier(s) of one or more target cells; (b) an identifier of an MBSFN synchronization area, in this circumstances, the MCCH message update information contained in the first control plane message is updated in all the cells in the MBSFN synchronization area; (c), frequency information of a cell, in this circumstances, the MCCH message update information contained in the first control plane message is updated in all the cells specified by the frequency; and (d) an identifier of an MBSFN synchronization area of an MCCH, in this circumstances, the MCCH message update information contained in the first control plane message is updated in all the cells in the MBSFN synchronization area of the MCCH;

3. MCCH message update information: this information refers to an MCCH message passing through ASN.1 encoding;

4. MCCH scheduling information: this information includes MCCH repetition period information and/or MCCH modification period information; and 5. target MCCH information: this information specifies an identifier of an MCCH in need of update.

In the embodiment, that the central network element needs to update MCCH messages of MBSFN cells of one or more distributed network elements refers to one of the following situations: (1) the central network element periodically sends the first control plane message to each distributed network element according to an MCCH modification period; (2) the central network element periodically sends the first control plane message to each distributed network element according to an MCCH repetition period; (3) the central network element sends the first control plane message to each distributed network element when the MCCH messages or the MCCH scheduling information changes; and (4) the distributed network elements instruct the central network element to update the MCCH messages.

In step 702 of the embodiment, that the distributed network element updates an MCCH message of a target cell refers to one of the following situations: (a) if the distributed network element is an RNC, the distributed network element processes its received MCCH message on a radio link control (RLC) layer, a media access control (MAC) layer and an FP protocol layer, and then sends, via an Iub interface, the processed MCCH message to a Node B where the target cell is located; and (b) if the distributed network element is an ENR or a Node B+ or other similar network element, the distributed network element processes its received MCCH message on a RLC layer, an MAC layer and a radio interface physical protocol layer, and then sends the processed MCCH message via a radio interface.

Example Three

Synchronization of MICH Messages

Figure 8:
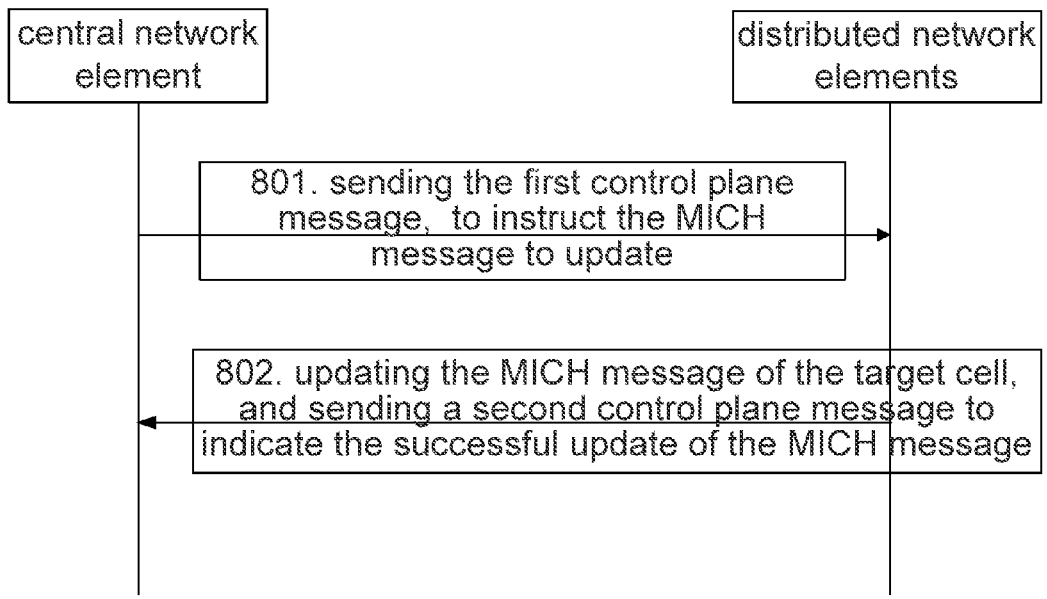
FIG. 8 is a signaling flowchart of processing Example Three of a method according to an embodiment of the invention.

In this embodiment, in a group of network elements, when a central network element needs to update MICH messages of MBSFN cells of one or more distributed network elements, the central network element and each distributed network element update control plane information via an interface between them; FIG. 8 is a signaling flowchart of processing Example Three of a method according to an embodiment of the invention, as shown in FIG. 8, the flow specifically includes the following steps 801 and 802:

step 801, a central network element sends a first control plane message to one or more distributed network elements, the contents contained in the message includes all or part of the following information: MICH message update information, MICH message update time information, MICH scheduling information, target cell information and target MICH information; if target cells belong to the same MBSFN synchronization area, the first control plane messages sent to the target cells have the same MICH message update time information, the same MICH message update information and the same MICH scheduling information; and step 802, each distributed network element correctly receives the first control plane message and respectively responds with a second control plane message via an interface between each distributed network element and the central network element, wherein the second control plane message is used for each distributed network element to respond to the central network element on the correct reception of the first control plane message; and each distributed network element updates an MICH message of a target cell according to the contents contained in the first control plane message, the MICH message update time information and the MICH scheduling information.

The following contents may be contained in the first control plane message:

1. MICH message update time information: this information indicates the time for updating the MICH message update information contained in the first control plane message via a radio interface of a target cell, and this information may be presented in one of the following forms: (1) system frame number (SFN) of a radio interface; (2) an absolute time value; (3) information of a specific modification period after reception of the first control plane message, wherein updating is started from the specific modification period; and (4) coordination time of the central network element and the distributed network elements;

2. target cell information, which specifies a target cell or target cells in which the MICH message update information contained in the first control plane message is updated, and this information can be presented in the following forms: (a) identifier(s) of one or more target cells; (b) an identifier of an MBSFN synchronization area, in this circumstances, the MICH message update information contained in the first control plane message is updated in all the cells in the MBSFN synchronization area; and (c) frequency information of a cell, in this circumstances, the MICH message update information contained in the first control plane message is updated in all the cells specified by the frequency;

3. MICH message update information; and

4. MICH scheduling information, which includes MICH modification period information.

That the central network element needs to update MICH messages of MBSFN cells of one or more distributed network elements refers to one of the following situations: the central network element periodically sends the first control plane message to each distributed network element according to an MICH modification period; the MICH messages are in need of change; the MICH channel scheduling information changes; and the distributed network elements instruct the central network element to update the MICH messages.

In step 802 of the embodiment, that the distributed network element updates an MICH message of a target cell refers to one of the following situations: if the distributed network element is an RNC, the distributed network element sends, via an Iub interface control plane massage, its received MICH message update information, MICH scheduling information and MICH message update time information to a Node B where the target cell is located; if the distributed network element is an FNB or a Node B+ or other similar network element, the distributed network element updates the MICH message at the moment specified by the update time according to a scheduling period.

Example Four

Figure 9:
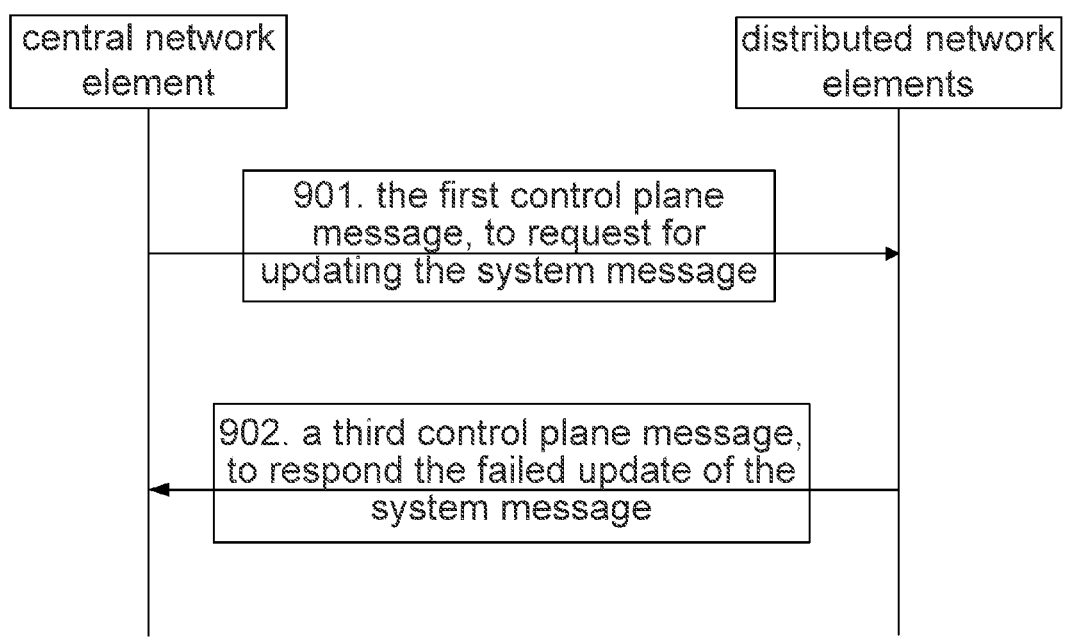
FIG. 9 is a signaling flowchart of processing Example Four of a method according to an embodiment of the invention.

A process carried out in the case where an update is failed is described in the embodiment. FIG. 9 is a signaling flowchart of processing Example Four of a method according to an embodiment of the invention, and the flow specifically includes the following steps 901 and 902:

step 901: when a central network elements needs to update common control messages of MBSFN cells of the distributed network elements, the central network element sends a first control plane message to one or more distributed network elements. The contents contained in the message includes: common control message update information, update time information and a target cell in need of update; if target cells belong to the same MBSFN synchronization area, the first control plane messages sent to the distributed network elements have the same update time information and the same common control message update information.

step 902: the distributed network element, via an interface between the central network element and it, responds the central network element with a third control plane message to indicate that it cannot process a common control message update request when it receives the first control plane message and fans in processing the received message. Information on failure reasons is contained in the message.

A user plane is described below for explaining the invention.

In a group of networking elements, when a central network element needs to synchronously send common control messages to MBSFN cells of one or more distributed network elements, the central network element sends the common control messages processed by a radio network user plane protocol to each distributed network element respectively via a user plane bearer between the central network element and each distributed network element, specifically:

the central network element and the one or more distributed network elements establish a user plane transmission bearer (s) for bearing common control message data in need of synchronous transmission. The central network element constructs contents of the common control messages, carries out user plane processing on the contents on a radio network protocol layer and marks time stamp information on the message data, wherein the time stamp information indicates time for sending the message data via a radio interface. The central network element sends the common control message data and the time stamp information of sending the common control message data to one or more distributed network elements via user plane transmission bearers among the distributed network elements.

The distributed network element that receives common control message data and the time stamp of the common control message data performs subsequent processing on the message and then sends the common control message data via a radio interface of a cell that needs to send the common control message at the moment specified by the time stamp.

In the method above, the radio network protocol user plane processing has the following forms: 1) the central network element processes common control messages on a RLC layer, marks a time stamp on an output RLC PDU and then sends the RLC PDU in the form of a frame protocol (FP) frame to one or more distributed network elements via transmission bearers between the central network element and the distributed network elements: the distributed network elements read the RLC PDU in the FP frame and perform processing on an MAC protocol layer and carry out subsequent processing; 2) the central network element processes common control messages on a RLC layer and an MAC layer, marks a time stamp on an output MAC PDU and then sends the MAC PDU in the form of a frame protocol (FP) frame to one or more distributed network elements via transmission bearers between the central network element and the distributed network elements; the distributed network elements read is the MAC PDU in the FP frame and perform subsequent processing.

The time stamp information above specifies the time for sending related common control message data via a radio interface and is presented in one of the following forms: (1) SFN of a radio interface, (2) CFN of a radio interface, and (3) an absolute time value.

The central network element requires MBSFN cells of one or more distributed network elements to synchronously send common control messages, which refers to one of the following situations: (a) the central network element per sends common control messages to each distributed network element using the method above; and (b) the central network element sends common control message data to each distributed network element when the common control messages or the scheduling information of the common control messages changes.

That the distributed network element performs subsequent processing on the MCCH message data further includes one of the following situations; (a) if the distributed network element is an RNC, the distributed network element sends common control messages processed on an MAC protocol layer to the Node B via an Iub interface in the form of an FP frame; and (b) if the distributed network element is an ENB or a Node B+ or other similar network element, the distributed network element sends common control message data processed on a radio interface physical protocol layer via a radio interface.

In summary, the invention solves the problems existing in related technologies by coordinating multiple distributed network elements with a central network element to realize synchronous transmission of the same common control messages, and is particularly applicable to the following circumstances: a group of RNCs construct a network in an MBSFN manner to realize synchronous MBMS transmission; a group of ENBs construct a network adopting MBSFN-dedicated carrier frequency to realize synchronous MBMS transmission; and a group of Nodes B+ construct a network adopting MBSFN-dedicated carrier frequency to realize synchronous MBMS transmission. Moreover, it should be understood by those skilled in the art that there are many other application scenes besides the three architectures above, no more description is given here.

The application of the invention can realize synchronous update and synchronous transmission of common control messages among cells of different network elements and implement the transmission of the common control messages in an MBSFN manner, thus improving the gain of a UE in reception of system messages and showing high applicability.

The mentioned above is only preferred embodiments of the invention but not limitations to the invention; to those skilled in the art, various modifications and variations can be made to the invention, and all the modifications, equivalent substitutes and improvements that are made without departing from the spirit and the principles of this invention shall belong to the protection scope of the invention.

The invention claimed is:

1. A synchronization method of common control messages among network elements, applied to a networking in which multimedia broadcast multicast services are carried out in manner of multimedia broadcast multicast service single frequency network, wherein the networking includes a central network element and at least one distributed network element, the method including:

instructing, by the central network element, the distributed network elements to synchronously update common control messages of their respective specific cells, wherein the central network element sends a first control plane message containing an update condition to instruct the distributed network elements to update their respective common control messages; and the distributed network elements update the common control messages according to the first control plane message;

wherein the update condition includes at least one of the following: update time, and information on specific target cells in which message update is carried out; wherein the specific target cells refer to all cells or cells specified by the target cell information contained in the update condition;

wherein the common control messages include at least one of the following: system messages, multimedia broadcast multicast service point-to-multipoint control channel messages, and multimedia broadcast multicast service notification indicator channel messages;

wherein in the case where the common control messages in need of update are multimedia broadcast multicast service point-to-multipoint control channel messages, an update condition includes identifiers of the multimedia broadcast multicast service point-to-multipoint control channels;

wherein the target cell information includes an identifier of a synchronization area of the multimedia broadcast multicast service single frequency network; and wherein the update time specifically includes one of the following: system frame number of a radio interface, connection frame number of a radio interface, time, and coordination time of the network elements in the networking; when the common control messages in need of update are multimedia broadcast multicast service point-to-multipoint control channel messages or multimedia broadcast multicast service notification indicator channel messages, the update time further includes information of a specific modification period after reception of the first control plane message, wherein updating is started from the specific modification period.

2. The method according to claim 1, wherein after the distributed network elements correctly receive the instruction from the central network element and, before the update is started or after the update is successfully finished, the method further including:

the distributed network elements respectively returning a second control plane message to the central network element to indicate that the instruction is received successfully or the update is successful.

3. The method according to claim 1, wherein after the distributed network elements receive the instruction from the central network element, in the case where the distributed network elements cannot carry out the update correctly, the method further including:

the distributed network elements respectively returning the central network element a third control plane message indicating the failed update.

4. The method according to claim 1, wherein in the case where the common control messages in need of update are system messages, an update condition includes at least one of the following: update time, information on specific target cells in which message update is carried out, an information block list of the system messages, and an operation instruction corresponding to an information block in the information block list.

5. The method according to claim 4, wherein the operation instruction includes one of the following: deleting information block, updating information block, and updated data information; and the operation instruction further includes scheduling information of the information block.

6. The method according to claim 1, wherein in the case where the common control messages in need of update are multimedia broadcast multicast service point-to-multipoint control channel messages, the update condition further includes at least one of the following: update time, information on specific target cells in which message update is carried out, update information of the multimedia broadcast multicast service point-to-multipoint control channel messages, and scheduling information of multimedia broadcast multicast service point-to-multipoint control channels.

7. The method according to claim 1, wherein in the case where the common control messages in need of update are multimedia broadcast multicast service notification indicator channel messages, an update condition includes at least one of the following: update time, information on specific target cells in which message update is carried out, update information of the multimedia broadcast multicast service notification indicator channel messages, and scheduling information of multimedia broadcast multicast service notification indicator channels.

8. The method according to claim 1, wherein specifically the target cell information further includes at least one of the following: a cell identifier, and frequency information of a cell.

9. The method according to claim 1, wherein the central network element sends an updated radio interface control plane common control message to the distributed network elements by sending a user plane message, the distributed network elements update common control messages of their respective specific cells according to the user plane message, and the user plane message includes common control message data processed on a radio network protocol layer and time stamp information thereof that indicates the time for sending the common control message data via a radio interface.

10. The method according to claim 1, wherein in the case where the networking belongs to a universal mobile telecommunication systems (UMTS) terrestrial radio access network, the central network element is a master radio network controller and the distributed network element is a slave radio network controller; or in the case where the networking belongs to a high speed packet access plus system, the central network element is a master control Node B+ and the distributed network element is a slave Node B+; or in the case where the networking belongs to a long term evolution system, the central network element is a multi-cell/multicast coordination entity, and the distributed network element is an evolved UMTS terrestrial radio access network Node B.

* * * * *

UNITED STATES PATENT AND TRADEMARK OFFICE
CERTIFICATE OF CORRECTION

PATENT NO. : 8,483,205 B2  Page 1 of 1
APPLICATION NO. : 12/988633
DATED : July 9, 2013
INVENTOR(S) : Ai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 296 days.

Signed and Sealed this
Eighth Day of September, 2015

Michelle K. Lee
*Director of the United States Patent and Trademark Office*